United States Patent
Seshadri et al.

(10) Patent No.: US 10,754,987 B2
(45) Date of Patent: Aug. 25, 2020

(54) SECURE MICRO-SERVICE DATA AND SERVICE PROVISIONING FOR IOT PLATFORMS

(71) Applicant: INTERNATIONAL BUSINESS MACHINES CORPORATION, Armonk, NY (US)

(72) Inventors: Padmanabha Venkatagiri Seshadri, Mysore (IN); Vijay Kumar Ananthapur Bache, Bangalore (IN); Bhagyashree Jayaram, Bangalore (IN); Bidhu Ranjan Sahoo, Bangalore (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 16/139,272

(22) Filed: Sep. 24, 2018

(65) Prior Publication Data
US 2020/0097670 A1    Mar. 26, 2020

(51) Int. Cl.
*G06F 21/60*    (2013.01)
*G06F 21/71*    (2013.01)
(Continued)

(52) U.S. Cl.
CPC ........... *G06F 21/629* (2013.01); *G06F 9/542* (2013.01); *H04L 9/0866* (2013.01); *H04L 9/14* (2013.01);
(Continued)

(58) Field of Classification Search
CPC ..... G06F 21/629; G06F 9/542; H04L 9/0866; H04L 9/14; H04L 9/3073; H04L 63/062; H04L 63/102; H04L 63/20
(Continued)

(56) References Cited

U.S. PATENT DOCUMENTS

| | | | |
|---|---|---|---|
| 6,766,007 B1 * | 7/2004 | Dermler | H04M 1/57 370/352 |
| 7,676,458 B2 * | 3/2010 | Aggarwal | G06K 9/00979 707/778 |

(Continued)

FOREIGN PATENT DOCUMENTS

| CN | 102196431 A | 9/2011 |
|---|---|---|
| CN | 105207969 A | 12/2015 |

OTHER PUBLICATIONS

Goldwasser et al., "Multi-input Functional Encryption*", EUROCRYPT 2014, LNCS 8441, pp. 578-602, 2014, © International Association for Cryptologic Research 2014.
(Continued)

*Primary Examiner* — Haresh N Patel
(74) *Attorney, Agent, or Firm* — Kristofer L. Haggerty

(57) ABSTRACT

A computer-implemented method for context-based, fine-grained data access control to microservice data is provided. The method may include retrieving a sensor data snapshot corresponding to the microservice data from a sensor node array of a microservice platform, and encrypting the sensor data snapshot according to a functional encryption scheme to generate an encrypted sensor data snapshot. The method may further include receiving a registration request from a user device, detecting an occurrence of the user-defined event based on sensory event data corresponding to the user event data, and generating a restricted-access functional decryption key in response to detecting the occurrence of the user-defined event. The restricted-access functional decryption key may be communicated to the user device for decryption of the encrypted sensor data snapshot according to an access control policy corresponding to a user-defined event associated with the user device.

18 Claims, 5 Drawing Sheets

(51) Int. Cl.

| | |
|---|---|
| *G06F 21/75* | (2013.01) |
| *G06F 21/62* | (2013.01) |
| *H04L 29/06* | (2006.01) |
| *H04L 9/30* | (2006.01) |
| *H04L 9/14* | (2006.01) |
| *G06F 9/54* | (2006.01) |
| *H04L 9/08* | (2006.01) |
| *H04L 29/08* | (2006.01) |

(52) U.S. Cl.
CPC .......... *H04L 9/3073* (2013.01); *H04L 63/062* (2013.01); *H04L 63/102* (2013.01); *H04L 63/20* (2013.01); *G06F 2221/2117* (2013.01); *H04L 67/12* (2013.01)

(58) Field of Classification Search
USPC .......................................................... 726/27
See application file for complete search history.

(56) References Cited

U.S. PATENT DOCUMENTS

| | | | | |
|---|---|---|---|---|
| 7,945,401 | B2* | 5/2011 | Bowdry | G01D 4/004 |
| | | | | 700/22 |
| 8,234,128 | B2 | 7/2012 | Martucci et al. | |
| 8,405,502 | B2 | 3/2013 | Teague | |
| 8,566,601 | B1 | 10/2013 | Waters | |
| 9,008,658 | B2 | 4/2015 | Baker et al. | |
| 9,071,657 | B2 | 6/2015 | Li et al. | |
| 9,211,065 | B2 | 12/2015 | Marsh et al. | |
| 9,456,090 | B2 | 9/2016 | Shankaranarayanan | |
| 9,665,736 | B2* | 5/2017 | Bartley | G06K 9/00771 |
| 2003/0132974 | A1* | 7/2003 | Bodin | G06F 3/017 |
| | | | | 715/863 |
| 2003/0200041 | A1* | 10/2003 | Church | G11B 5/3166 |
| | | | | 702/104 |
| 2004/0114176 | A1* | 6/2004 | Bodin | G06T 11/60 |
| | | | | 358/1.15 |
| 2004/0181370 | A1* | 9/2004 | Froehlich | G06F 9/5083 |
| | | | | 702/187 |
| 2004/0181794 | A1* | 9/2004 | Coleman | G06F 11/008 |
| | | | | 718/104 |
| 2004/0218068 | A1* | 11/2004 | Bodin | H04N 1/00244 |
| | | | | 348/231.99 |
| 2005/0010812 | A1* | 1/2005 | Terrell | G06F 11/302 |
| | | | | 726/4 |
| 2008/0147515 | A1* | 6/2008 | Abraham | G06Q 30/0603 |
| | | | | 235/383 |
| 2012/0154582 | A1* | 6/2012 | Johnson | G06F 19/321 |
| | | | | 348/143 |
| 2013/0013206 | A1* | 1/2013 | Guha | G01W 1/10 |
| | | | | 702/3 |
| 2013/0209991 | A1* | 8/2013 | Wang | A61B 5/1473 |
| | | | | 435/5 |
| 2013/0249950 | A1* | 9/2013 | Mahmoud | G06F 3/0488 |
| | | | | 345/660 |
| 2014/0035745 | A1* | 2/2014 | Bell | G08B 21/02 |
| | | | | 340/539.12 |
| 2015/0006141 | A1* | 1/2015 | Enenkel | G06F 30/18 |
| | | | | 703/18 |
| 2016/0057304 | A1* | 2/2016 | Yamaguchi | H04N 1/00891 |
| | | | | 358/1.14 |
| 2016/0221583 | A1* | 8/2016 | Valeri | B60W 50/0098 |
| 2016/0269368 | A1 | 9/2016 | Choi et al. | |
| 2017/0018128 | A1* | 1/2017 | Berezin | G07C 9/00309 |
| 2017/0070351 | A1 | 3/2017 | Yan | |
| 2017/0163971 | A1* | 6/2017 | Wang | H04N 13/218 |
| 2017/0364644 | A1* | 12/2017 | Johnson | G06F 19/321 |
| 2018/0224552 | A1* | 8/2018 | Wang | G01S 17/10 |
| 2019/0073817 | A1* | 3/2019 | Sung | G06F 3/167 |

OTHER PUBLICATIONS

"Lattice Cryptography (permanently under construction!)", http://cseweb.ucsd.edu/~daniele/LatticeLinks/FE.html, Functional Encryption, Accessed on Oct. 5, 2018, 5 pages.

Blackstock et al., "IoT Interoperability: A Hub-based Approach", 2014 International Conference on the Internet of Things (IOT), 6 pages.

Desai et al., "Semantic Gateway as a Service architecture for IoT Interoperability", (MS), 2015 IEEE International Conference on Mobile Services, pp. 313-319. IEEE.

Aloi et al., "A Mobile Multi-Technology Gateway to Enable IoT Interoperability", 2016 IEEE First International Conference on Internet-of-Things Design and Implementation, pp. 259-264.

Aloi et al., "Enabling IoT interoperability through opportunistic smartphone-based mobile gateways", Journal of Network and Computer Applications, © 2016 Elsevier Ltd, 12 pages.

Zhang et al., "An Open, Secure and Flexible Platform Based on Internet of Things and Cloud Computing for Ambient Aiding Living and Telemedicine", 2011 IEEE, 4 pages.

Hur et al., "Automated Deployment of IoT Services Based on Semantic Description", 2015 IEEE, 6 pages.

Boneh et al., "Functional Encryption: Definitions and Challenges", TCC 2011, LNCS 6597, pp. 253-273, 2011, © International Association for Cryptologic Research 2011.

Liu, et al., "A Security Framework for the Internet of Things in the Future Internet Architecture", Future Internet MDPI, 2017, 28 pages, Creative Commons Attribution, Basel Switzerland.

Lee, at al., "A Work in Progress: Context based encryption scheme for Internet of Things", ScienceDirect, 2015, 5 pages, Elsevier B.V., Seoul, South Korea.

Mell et al., "The NIST Definition of Cloud Computing", Recommendations of the National Institute of Standards and Technology, Special Publication 800-145, Sep. 2011, 7 pages.

* cited by examiner

SECURE MICRO-SERVICE DATA AND SERVICE PROVISIONING FOR IOT PLATFORMS

BACKGROUND

The present invention relates generally to the field of data access control, and in particular to fine-grained data access control for microservices.

A Microservice is a software development technique—a variant of the service-oriented architecture (SOA) architectural style that structures an application as a collection of loosely coupled services. In a microservices architecture, services are fine-grained, and the protocols are lightweight. The benefit of decomposing an application into different smaller services is that it improves modularity and makes the application easier to understand, develop, test, and more resilient to architecture erosion. It also parallelizes development by enabling small autonomous teams to develop, deploy and scale their respective services independently. It also allows the architecture of an individual service to emerge through continuous refactoring. Microservices-based architectures enable continuous delivery and deployment.

SUMMARY

A computer-implemented method, computer system, and computer program product for context-based, fine-grained data access control to microservice data is provided. In an aspect, the method may include retrieving a sensor data snapshot corresponding to the microservice data from a sensor node array of a microservice platform, and encrypting the sensor data snapshot according to a functional encryption scheme to generate an encrypted sensor data snapshot. The method may further include receiving a registration request from a user device, detecting an occurrence of the user-defined event based on sensory event data corresponding to the user event data, and generating a restricted-access functional decryption key in response to detecting the occurrence of the user-defined event. The restricted-access functional decryption key may be communicated to the user device for decryption of the encrypted sensor data snapshot according to an access control policy corresponding to a user-defined event associated with the user device.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
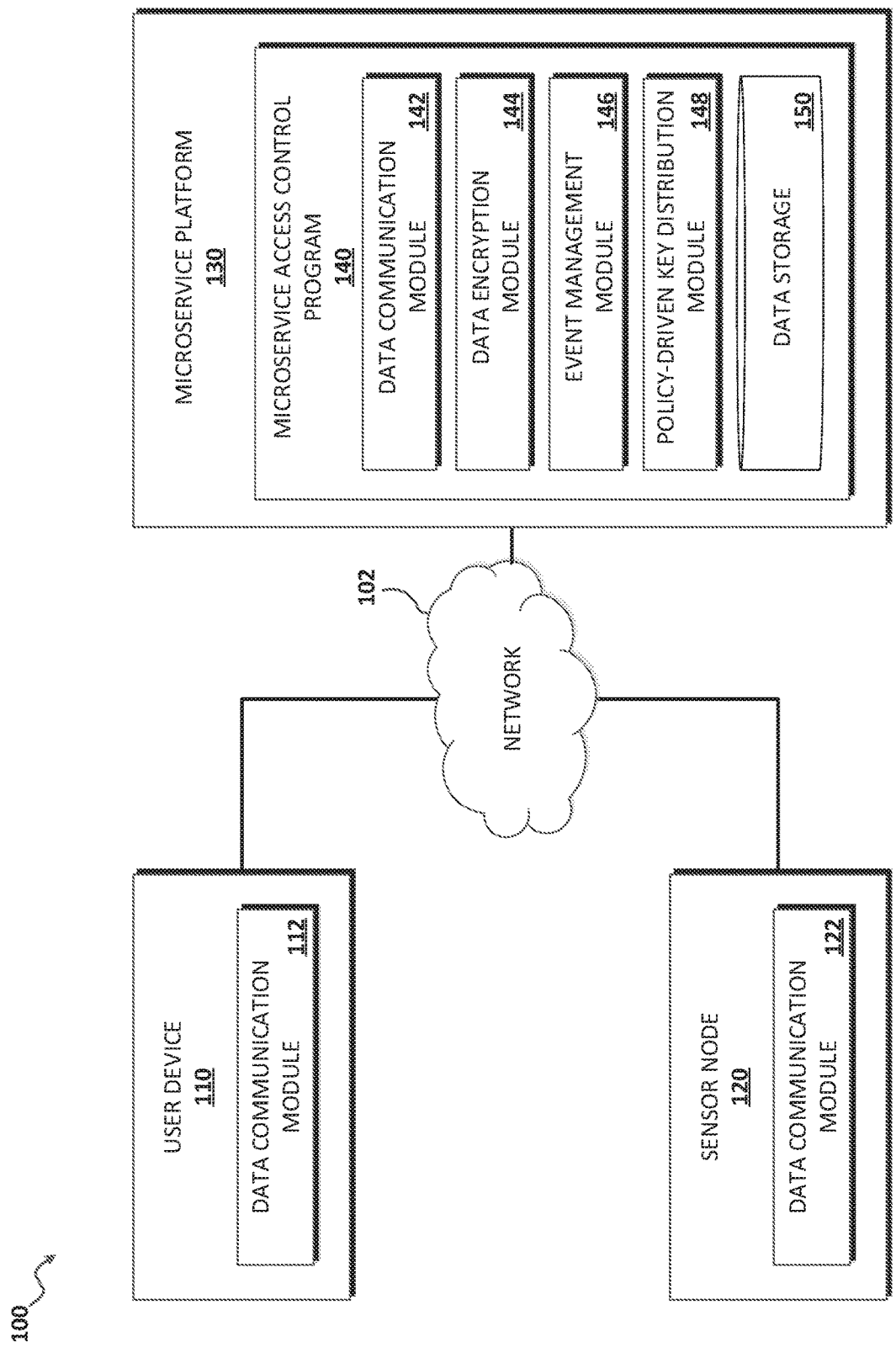
FIG. 1 is a functional block diagram depicting a microservice access control system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

The Internet of Things (IoT) is the network of physical devices, vehicles, home appliances, and other items embedded with electronics, software, sensors, actuators, and connectivity which enables these things to connect and exchange data, creating opportunities for more direct integration of the physical world into computer-based systems, resulting in efficiency improvements, economic benefits, and reduced human exertions.

IoT technology has seen wide-spread deployment. Such ubiquity means tons of data is produced which could be very valuable or might even infringe upon privacy. The data produced by IoT devices may be effectively harnessed and utilized by way of a microservice platform. Therefore, some form of secure access control is required. However, even publicly observable access control policies (e.g. a set of IoT beacons that provide location information to a user), could violate privacy (e.g. via location covered by the beacons). At other times, access control is hard to enforce through encryption, because the access space is huge (for instance, region of interest in an image captured by street camera) and encrypting all possible combinations of access is impractical. Therefore, there is a need for an access control mechanism which protects the access policy and at the same time caters to the huge access space that needs to be protected.

Accordingly, there is a need in the art for a method that overcomes the aforementioned problems associated with the "all-or-none" access control security provided by prior methods (e.g. SSO for access control), which do not sufficiently incorporate various security polices for numerous users.

Embodiments of the present invention are directed to a method, system, and computer program product for context-based, fine-grained data access control to data and services ("microservice data") of a microservice platform. The microservice data may include a sensor data snapshot including data retrieved from one or more sensor nodes of a sensor node array. The sensor data snapshot may be encrypted according to a functional encryption scheme to generate an encrypted sensor data snapshot. A registration request, including user event data corresponding to a user-defined event, may be received from a user device to register an occurrence of the user-defined event as a request to access the sensor data snapshot by way of the user device. The occurrence of the user-defined event may be detected by the sensor node array based on the user event data corresponding to the user-defined event. In response to detection of the occurrence, a restricted-access functional decryption key may be generated with respect to the encrypted sensor data snapshot based on sensory event data corresponding to the detected occurrence and a user function associated with the user device. The restricted-access decryption key may be communicated to the user device to enable and provide contextual, fine-grained data access to the sensor data snapshot by decryption of the encrypted sensor data snapshot by way of the restricted-access decryption key. Accordingly, the present invention may be implemented to facilitate selective and secure data availability and provisioning of microservice data to individual users according to various access policies without compromising the privacy or sensitivity of data associated with others.

Advantageously, the present invention overcomes the aforementioned problems associated with the prior access security control methods by providing a method for provisioning microservice data for fine-grained data access thereto by individual users. The microservice data may be provisioned for access by each user on a case-by-case basis based on contextual conditions of each user at the time of requesting access, and access (security) policies corresponding to the contextual conditions. In particular, the present invention enables restricted, context-dependent data access to data, such as microservice data, by large numbers of users while considering and protecting the privacy of individuals with which portions of the data may be associated. To that end, the present invention improves computer technology, particularly with respect to large-scale data access, by enabling secured access to large bodies of data by large numbers of users based on access policies specifically mapped and applied to each user based on context.

FIG. 1 is a functional block diagram depicting microservice access control system 100, in accordance with an embodiment of the present invention. Microservice access control system 100 may include user device 110, sensor node 120, and microservice platform 130 interconnected over network 102. While microservice access control system 100 is depicted in FIG. 1 as including three discrete devices, other arrangements may be contemplated. For example, microservice access control system 100 may include a plurality of user devices such as user device 110, and/or a sensor node array formed by one or more sensor nodes such as sensor node 120. In various embodiments, user device 110, sensor node 120, and/or microservice platform 130 may be formed by one or more integrated or distinct devices.

In various embodiments, network 102 may include an intranet, a local area network (LAN), a personal area network (PAN), a wireless local area network (WLAN), a wireless personal area network (WPAN), a wireless mesh network, a wide area network (WAN) such as the Internet, or the like. Network 102 may include wired, wireless, or fiber optic connections. Generally, network 102 may include any combination of connections and protocols for supporting communications between user device 110, sensor node 120, and microservice platform 130, in accordance with embodiments of the present invention.

In various embodiments, user device 110, sensor node 120, and/or microservice platform 130 may include a computing platform or node such as a microcontroller, a microprocessor, a wearable device, an implantable device, a mobile or smart phone, a tablet computer, a laptop computer, a desktop computer, a server such as a database server, a virtual machine, or the like. In the various embodiments, user device 110, sensor node 120, and/or microservice platform 130 may otherwise include any other type of computing platform, computer system, or information system capable of sending and receiving data to and from another device, such as by way of network 102. In certain embodiments, user device 110, sensor node 120, and/or microservice platform 130 may include internal and external hardware components, such as described with reference to FIG. 3. In other embodiments, user device 110, sensor node 120, and/or microservice platform 130 may or by way of a cloud computing environment, such as described with reference to FIGS. 4 and 5.

User device 110 hosts data communication module 112. User device 110 may implement a combination of devices and technologies such as network devices and device drivers to support the operation of data communication module 112, and provide a platform enabling communications between user device 110, sensor node 120, and microservice platform 130, in accordance with embodiments of the present invention.

Data communication module 112 may implement an application or program such as a software program, one or more subroutines contained in a program, an application programming interface, or the like, to support communications between user device 110, sensor node 120, and microservice platform 130, in accordance with embodiments of the present invention.

As an example, user device 110 may include a mobile computing platform such as a mobile phone, and data communication module 112 may include a network interface controller, a near-field communication (NFC) module, a short-range wireless communication module, and the like. User device 110 may conjunction with data communication module 112 to receive microservices from microservice platform 130 over network 102 for consumption by a user.

Sensor node 120 hosts data communication module 122. Sensor node 120 may implement a combination of devices and technologies such as network devices and device drivers to support the operation of data communication module 122, and provide a platform enabling communications between user device 110, sensor node 120, and microservice platform 130, in accordance with embodiments of the present invention.

Data communication module 122 may implement an application or program such as a software program, one or more subroutines contained in a program, an application programming interface, or the like, to support communications between user device 110, sensor node 120, and microservice platform 130, in accordance with embodiments of the present invention.

In various embodiments, sensor node 120 may include, for example, an IoT device including a sensor or transducer for detecting signals corresponding to conditions in an environment. In the various embodiments, sensor node 120 may monitor and detect digital or electronic signals in the environment. The digital or electronic signals may include, for example, communication signals emitted by user device 110. In the various embodiments, sensor node 120 may generate plaintext sensor data corresponding to the detected signals in the environment. For example, the digital or electronic signals may be emitted by user device 110 and correspond to conditions in which user device 110 is present or located at a position in the environment. Sensor node 120 may include a camera, a data beacon, an access point (e.g. a Wi-Fi access point), and the like.

As an example, sensor node 120 may include a camera and a data beacon, and data communication module 122 may include a network interface controller, a near-field communication module, a short-range wireless communications module, and the like. Sensor node 120 may conjunction with data communication module 122 to detect optical (i.e. electromagnetic) energy and to generate corresponding microservice data including plaintext images or video for communication to and retrieval by microservice platform 130 over network 102.

In an embodiment, the microservice data may include plaintext sensor data corresponding to the sensor data generated by one or more of the sensor nodes of the sensor node array. Sensor data may be generated by the sensor node array, and/or by one or more of the sensor nodes thereof. For purposes of the present disclosure, "plaintext microservice data" is used herein to refer to the plaintext sensor data of the microservice data.

Microservice platform 130 hosts microservice access control program 140. Microservice platform 130 may implement a combination of devices and technologies such as network devices and device drivers to support the operation of microservice access control program 140, and provide a platform enabling communications between user device 110, sensor node 120, and microservice platform 130, in accordance with embodiments of the present invention.

Microservice platform 130 may implement sensor node 120 to generate microservice data for communication to user device 110. In various embodiments, microservice platform 130 may implement a distributed sensor node array to generate the microservice data. The sensor node array may include any combination of sensor nodes such as sensor node 120. Accordingly, the microservice data may include multimodal microservice data. In the various embodiments, microservice platform 130 may retrieve a sensor data snapshot from the sensor node array. The sensor data snapshot may include microservice data corresponding to sensor data as such may be generated by one or more sensor nodes of the sensor node array at a given point in time. For example, the sensor node array may include a network of video cameras such as in a closed-circuit television (CCTV) network.

Microservice access control program 140 includes data communication module 142, data encryption module 144, event management module 146, policy-driven key distribution module 148, and data storage 150. Microservice access control program 140 may include an application or program such as a software program, one or more subroutines contained in a program, an application programming interface, or the like.

Data communication module 142 may retrieve the sensor data snapshot from the sensor node array, receive a registration request and a user function from user device 110, communicate the registration request to the sensor node array, receive sensory event data with respect to the registration request from the sensor node array, and communicate a restricted user access function to user device 110. Data communication module 142 may store the data in data storage 150 for retrieval and use by microservice access control program 140, in accordance with embodiments of the present invention.

In an embodiment, the sensor data snapshot may include aggregated sensor data, as generated by one or more sensor nodes of the sensor array.

Data encryption module 144 may encrypt the sensor data snapshot according to a functional encryption scheme to generate an encrypted sensor data snapshot. The sensor data snapshot may include plaintext sensor data generated by one or more of the sensor nodes of the sensor array.

In general, functional encryption supports restricted secret keys that enables a key holder (e.g. user device 110) to learn a specific function of encrypted data, but learn nothing else about the data. For example, given an encrypted program the secret key may enable the key holder to learn the output of the program on a specific input without learning anything else about the program.

In a functional encryption system, a decryption key allows a user to learn a function of the encrypted data. Briefly, in a functional encryption system for functionality $F(\bullet, \bullet)$ (modeled as a Turing Machine) an authority holding a master secret key can generate a key $sk_k$ that enables the computation of the function $F(k, \bullet)$ on encrypted data. More precisely, using $sk_k$ the decryptor can compute $F(k, x)$ from an encryption of x. Intuitively, the security of the system guarantees that one cannot learn anything more about x.

With respect to functional encryption for any polynomial-time Turing Machine $F(\bullet, \bullet)$, such as in applications of access control, one could let x=(ind,m) encode a message m as well as an arbitrarily complex access control program ind that will act over the description of a user's credentials. The functionality F would interpret the program ind over k and output the message m if and only if ind accepts on input k. Moreover, the program ind would be hidden and thus one would not necessarily know why decryption was successful or what other keys would satisfy ind. The goal is to capture the notion that the adversary learns nothing about the plaintext other than functions $F(k, \bullet)$ of the plaintext for which the user has a secret key.

In an embodiment, the user function may correspond to a secret key. In the embodiment, the restricted user access function may correspond to a restricted secret key. The secret key and the restricted secret key are described in further detail below with reference to FIG. 2.

Event management module 146 may facilitate detection of the occurrence of the user-defined event with respect to the registration request received from user device 110. Event management module 146 may receive the registration request by way of data communication module 142.

In an embodiment, the registration request may include user event data corresponding to a user-defined event by which access to the sensor data snapshot may be desired (i.e. by the user of user device 110). In the embodiment, the user event data may specify the user-defined event in terms of the sensory event data (i.e. sensor data) corresponding to specific environmental and/or digital conditions ("context") in an environment. That is, the registration request may be sent from user device 110 to microservice platform 130 for registration of the user-defined event, which may occur and subsequently be detected at a point in time when the sensory event data corresponds to particular environmental and/or digital conditions in the environment, as specified by the user event data of the registration request. In the embodiment, the registration request may be communicated to the sensor node array in terms of the user event data corresponding to the user-defined event for detecting the occurrence of the user-defined event.

Policy-driven key distribution module 148 may generate the restricted user access function by mapping a context of user device 110 to an access control policy.

In an embodiment, the access control policy may include a decryption policy. The decryption policy may define the extent to which the encrypted sensor data snapshot may be decrypted as a function of the context of user device 110. For example, the decryption policy may be specified in the ciphertext of the encrypted sensor data snapshot such that only individuals (e.g. the user of user device 110) who satisfy the policy can decrypt. In the embodiment, the decryption policy may restrict access to a function of the plaintext sensor data (i.e. of the encrypted sensor data snapshot) based on the context of user device 110.

As an example, one may consider a cloud service storing encrypted images. An individual may require the cloud to search for an image of a particular object. If the encrypted images include sensitive images, such as of personal information associated with another individual, then the cloud would ideally need a restricted secret key for decrypting images that contain the target object, but reveals nothing about the other, sensitive images. More generally, the secret key may only reveal a function of the plaintext image, for example an image that is blurred everywhere except for the target object.

Figure 2:
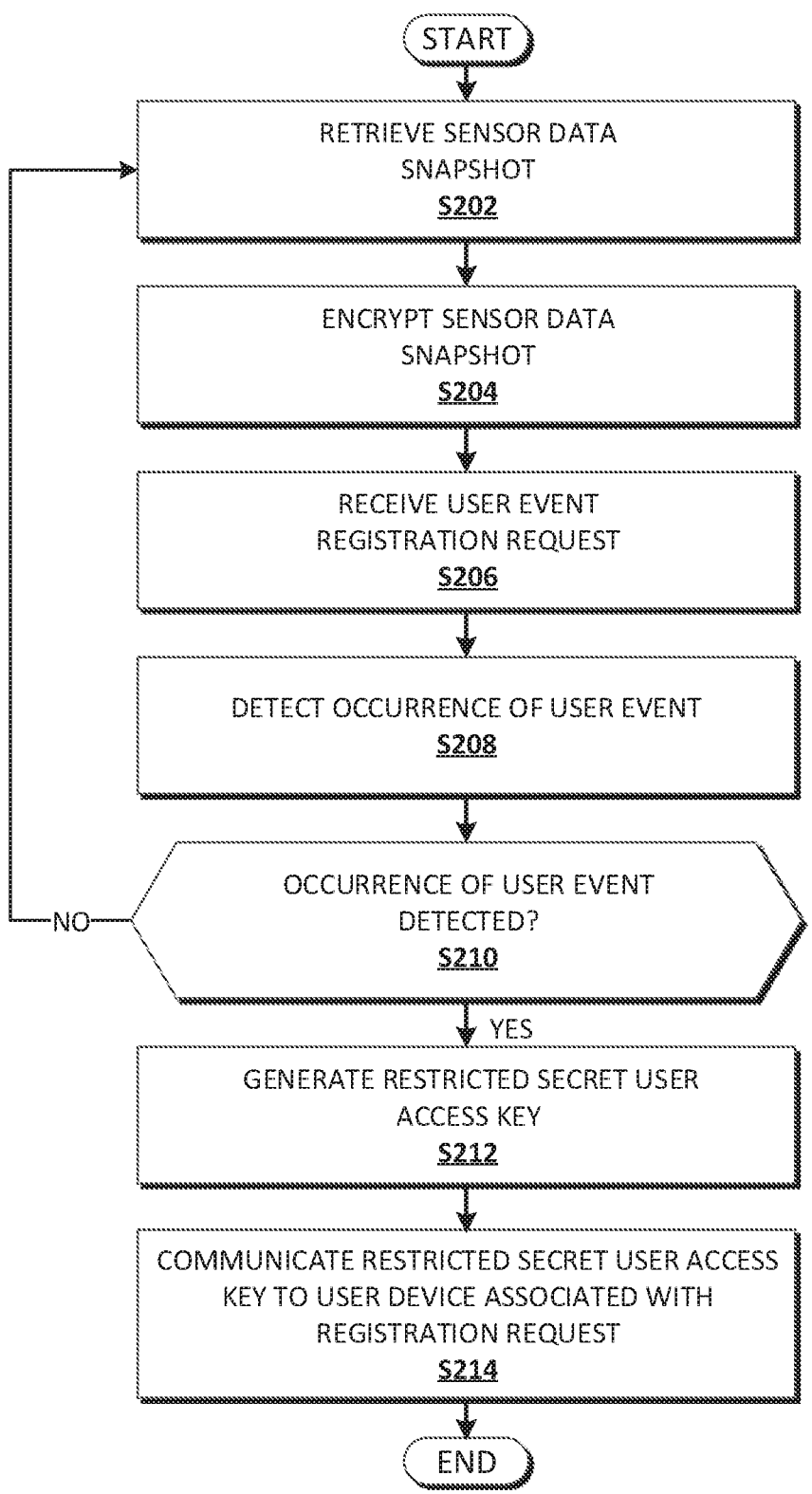
FIG. 2 is a flowchart depicting operational steps of an aspect of the micro service access control system, in accordance with an embodiment of the present invention.

FIG. 2 is a flowchart depicting operational steps of an aspect of microservice access control system 100, in accordance with an embodiment of the present invention.

At Step S202, data communication module 142 may retrieve the sensor data snapshot from the sensor node array.

In an embodiment, retrieving the sensor data snapshot may include retrieving the plaintext sensor data generated by one or more of the sensor nodes of the sensor node array at a particular point in time (i.e. at the time of the snapshot), and subsequently aggregating the data into the sensor data snapshot.

At step S204, data encryption module 144 may encrypt the sensor data snapshot, with respect to the plaintext sensor data, according to a functional encryption scheme to generate an encrypted sensor data snapshot.

For example, in a functional encryption scheme, a secret key $sk_f$ can be created for any functions, $f$, from a class F; such a secret key is derived from the master secret key, MSK. Given any ciphertext, c, with underlying plaintext, x, using $sk_f$, a user (e.g. of user device 110) can efficiently compute $f(x)$. The result of computing $f(x)$ may include decryption of a portion of the plaintext, x. The security of functional encryption requires that the adversary "does not learn anything" about x, other than the computation result $f(x)$.

A typical example is the delegation of spam filtering to an outside server as follows: Alice publishes her public key online and gives the spam filter a key for the filtering function; Users sending email to Alice will encrypt the email with her public key. The spam filter can now determine by itself, for each email, whether to pass it along to Alice's mailbox or to deem it as spam, but without ever learning anything about Alice's email (other than the fact that it was deemed a spam message or not). This example inherently requires computing a function $f$ on a single ciphertext.

In an embodiment, the sensor data snapshot may be encrypted to enable the generation and release of a restricted-access functional decryption key (i.e. a secret key), $sk_f$, to user device 110. In the embodiment, the sensor data snapshot may be encrypted according to a hierarchical functional encryption scheme, an identity-based encryption scheme, and/or a multi-input functional encryption scheme.

The functional encryption scheme may otherwise include any other type of functional encryption scheme for encrypting the sensor data snapshot, in accordance with embodiments of the present invention.

In a hierarchical functional encryption scheme, for example, a key generation algorithm may produce a public key, pk, and a secret key, $sk_{id}$, for the identity function, $id(m)=m$. Other secret keys may be obtained by running a key delegation algorithm that, on input of the secret key, $sk_{id}$, for some function, $f$, and the description of another function, g, produces a secret key, $sk_{g,f}$, for use with respect to the composition of the two functions, $(g,f)(m)=g(f(m))$.

An identity-based encryption scheme (in both its standard and hierarchical form) may include a special case of the hierarchical functional encryption scheme, as previously described. As an example, the identity-based encryption scheme may be implemented with respect to functions of a certain type—functions indexed by strings, u, such that $f(u)(u, m)=(u, m)$ and $f(u)(x, m)=(x)$, if $x \ne u$. Here, an identity of a user (e.g. of user device 110), u, may be associated with a corresponding secret key, $sk_u$, such that ciphertext, c(u, m), including underlying plaintext, m, may only be deciphered for access by the user by way of the corresponding secret key, $sk_u$. In an embodiment, a parameter of the user function of user device 110 may include the identity of the user.

In a multi-input functional encryption scheme, for example, let $f$ be an n-ary function where n>1 can be a polynomial in the security parameter. The multi-input functional encryption scheme may be defined such that the owner of the master secret key, MSK, can derive special keys $SK_f$ whose knowledge enables the computation of $f(x_1, \ldots, x_n)$ from n ciphertexts $c_1, \ldots, c_n$ of underlying messages $x_1, \ldots, x_n$ with respect to the same master secret key MSK. The different ciphertexts $c_i$ to be each encrypted under a different encryption key $EK_i$ to capture the setting in which each ciphertext was generated by an entirely different party.

At step S206, event management module 146 may receive a registration request from user device 110. The registration request may include user event data corresponding to a user-defined event, as previously described. In an embodiment, the registration request may be received by event management module 146 from data communication module 142. In the embodiment, a detected occurrence of the user-defined event may correspond to conditions (e.g. environmental, digital, etc.) by which access to the encrypted sensor data snapshot is requested by user device 110.

For example, a user may implement user device 110 to communicate a registration request to microservice platform 130 to register a user-defined event in which the user (and by extension, user device 110) enters into or otherwise becomes positioned in a particular location or area (i.e. an environment). An occurrence of the user-defined event may be defined by the user, by way of the registration request, to correspond to an event in which user device 110 enters into the location associated with the registration request, at which time access to the encrypted sensor data snapshot, by way of user device 110, may be requested or otherwise desired by the user. The user-defined event may be specified by user event data of the registration request in terms of sensory event data corresponding to environmental and/or digital conditions in the environment indicating that a location of user device 110 coincides with that of the user-defined event. In this example, an occurrence of the user-defined event may be detected at the point in time at which the sensory event data corresponds to the user event data of the registration request. That is, the user-defined event may occur when user device 110 enters the environment, at which point the occurrence of the user-defined event may be detected based on the sensory event data corresponding to the environmental and/or digital conditions specified by the user event data of the registration request. The environment may include, for example, a region that is covered or within detecting range of one or more sensor nodes of the sensor node array.

At step S208, event management module 146 may detect an occurrence of the user-defined event. In an embodiment, the occurrence of the user-defined event may be detected by way of the sensor array based on sensory event data corresponding to the user event data.

For example, event management module 146 may communicate the user event data of the registration request to the sensor node array for detecting the occurrence based on sensory event data corresponding to or substantially matching the user event data. The sensory event data may be generated by one or more sensor nodes of the sensor array.

At step S210, event management module 146 may determine whether or not the occurrence of the user-defined event has been detected. Where the occurrence is not detected, the method proceeds to Step S202. Where the occurrence is detected, the method proceeds to Step S212. In an embodiment, the occurrence of the user-defined event may be determined to have been detected by comparing the sensory event data with the corresponding user event data of the registration request to determine if there is a match.

For example, event management module 146 may receive the sensory event data from the sensor array for comparison with the corresponding user event data to determining whether or not the occurrence of the user-defined event has been detected. Event management module 146 may determine that the occurrence of the user-defined event has been detected where the comparison reveals that the environmental and/or digital conditions in the environment substantially match the sensory event data.

At step S212, policy-driven key distribution module 148 may generate the restricted-access functional decryption key, $sk_f$, in response to detecting the occurrence of the user-defined event. In an embodiment, the restricted-access functional decryption key may be generated with respect to the encrypted sensor data snapshot based on the sensory event data corresponding to the detected occurrence and the user function associated with the user device.

In an embodiment, generating the restricted-access functional decryption key may include determining a context of user device 110 based on the sensory event data associated with the detected occurrence. In the embodiment, generating the restricted-access functional decryption key may further include mapping the context of user device 110 to an access control policy based on the user event data. In the embodiment, the context of user device 110 may be mapped to the access control policy to ensure that user device 110 may be appropriately served. For example, if user device 110 is restricted from accessing location services in certain floors of a shopping mall, then a presence of user device 110 on such floors is used as context to prevent access to certain content.

In an embodiment, generating the restricted-access functional decryption key may include generating a composite user function by combining the user function with a contextual filter corresponding to the access control policy to which the context is mapped. The composite user function may be generated to restrict access to the encrypted sensor data snapshot based on the access control policy. In the embodiment, the restricted-access functional decryption key may be generated with respect to the composite user function for decryption of the encrypted sensor data snapshot as a function of the parameters of the composite user function.

For example, the user function (as described with reference to data communication module 142) may include an identity function (e.g. $f_u$) for which a corresponding secret key (e.g. $sk_u$) may be generated and released (to user device 110). In the embodiment, the restricted user access function (also described with reference to data communication module 142) may include a composite function (e.g. $(g,f)(m)=g(f(m))$).

At step 214, data communication module 142 may communicate the restricted-access functional decryption key to user device 110. In an embodiment, user device 110 may process the encrypted snapshot with the user function by transmitting the key to microservice platform 130 to obtain the results encrypted in a public key, for decryption by the restricted-access functional decryption key.

As an example, the present invention may be applied with respect to a scenario in which a user (e.g. of user device 110) would like street cameras to keep an eye on their surroundings as they walk along a street during the evening. However, if the camera gives out the raw content, it could potentially violate the privacy of other people. Also, the user's context needs to be understood by the camera network lest it might be misused by malicious actors such as criminals. When the user moves along the street, the context may be monitored by cameras and sensors (e.g. the sensor node array). Other factors relevant to the context such as past criminal record, etc. from the user's identity store may be retrieved and considered. The method may obtain the user function, which may correspond, for example, to a request such as "determine the number of people following me that are within a range of 200 meters," generate a decryption key for it (to decrypt relevant sensor data from the street cameras), and sends it to the user. The user may then implement the key to retrieve and decrypt the relevant sensor data. Accordingly, the microservice data generated by the sensor node array (i.e. the video feed from the camera network) may be provisioned for access by the user to enable determination of the number of people following the user within a range of 200 meters, while restricting access to any and all other data that may potentially expose the privacy of others.

Figure 3:
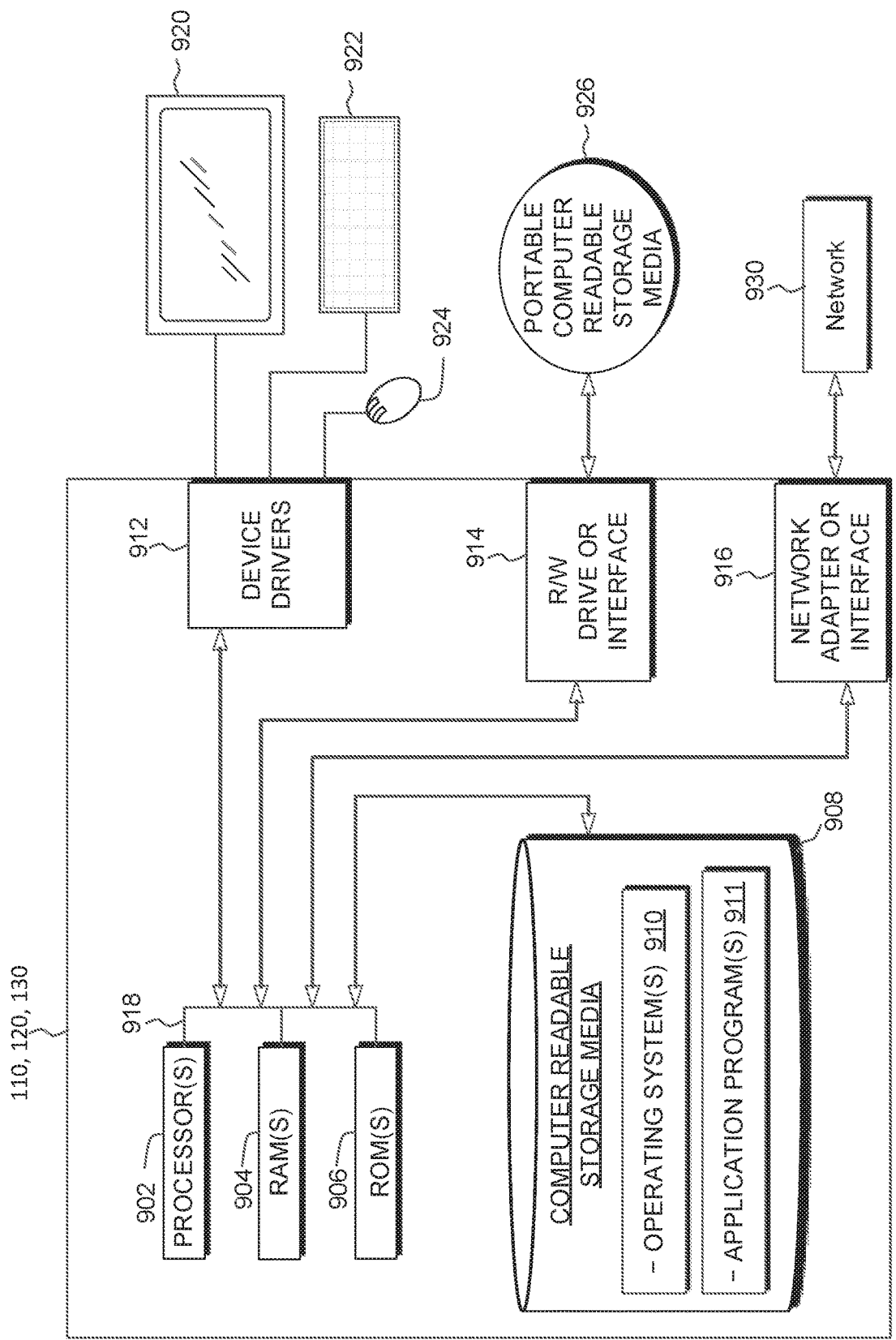
FIG. 3 is a block diagram depicting a user device, a sensor node, and/or a microservice platform, in accordance with an embodiment of the present invention.

FIG. 3 is a block diagram depicting user device 110, sensor node 120, and/or microservice platform 130, in accordance with an embodiment of the present invention.

As depicted in FIG. 3, user device 110, sensor node 120, and/or microservice platform 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as microservice access control program 140 residing on microservice platform 130, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User device 110, sensor node 120, and/or microservice platform 130 may also include a R/W drive or interface 914 to read from and write to one or more portable computer readable storage media 926. Application programs 911 on user device 110, sensor node 120, and/or microservice platform 130 may be stored on one or more of the portable computer readable storage media 926, read via the respective R/W drive or interface 914 and loaded into the respective computer readable storage media 908. User device 110, sensor node 120, and/or microservice platform 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the server 220 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. User device 110, sensor node 120, and/or microservice platform 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

User device 110, sensor node 120, and/or microservice platform 130 can be a standalone network server, or represent functionality integrated into one or more network systems. In general, user device 110, sensor node 120, and/or microservice platform 130 can be a laptop computer, desktop computer, specialized computer server, or any other computer system known in the art. In certain embodiments, user device 110, sensor node 120, and/or microservice platform 130 represents computer systems utilizing clustered computers and components to act as a single pool of seamless resources when accessed through a network, such as a LAN, WAN, or a combination of the two. This implementation may be preferred for data centers and for cloud computing applications. In general, user device 110, sensor node 120, and/or microservice platform 130 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
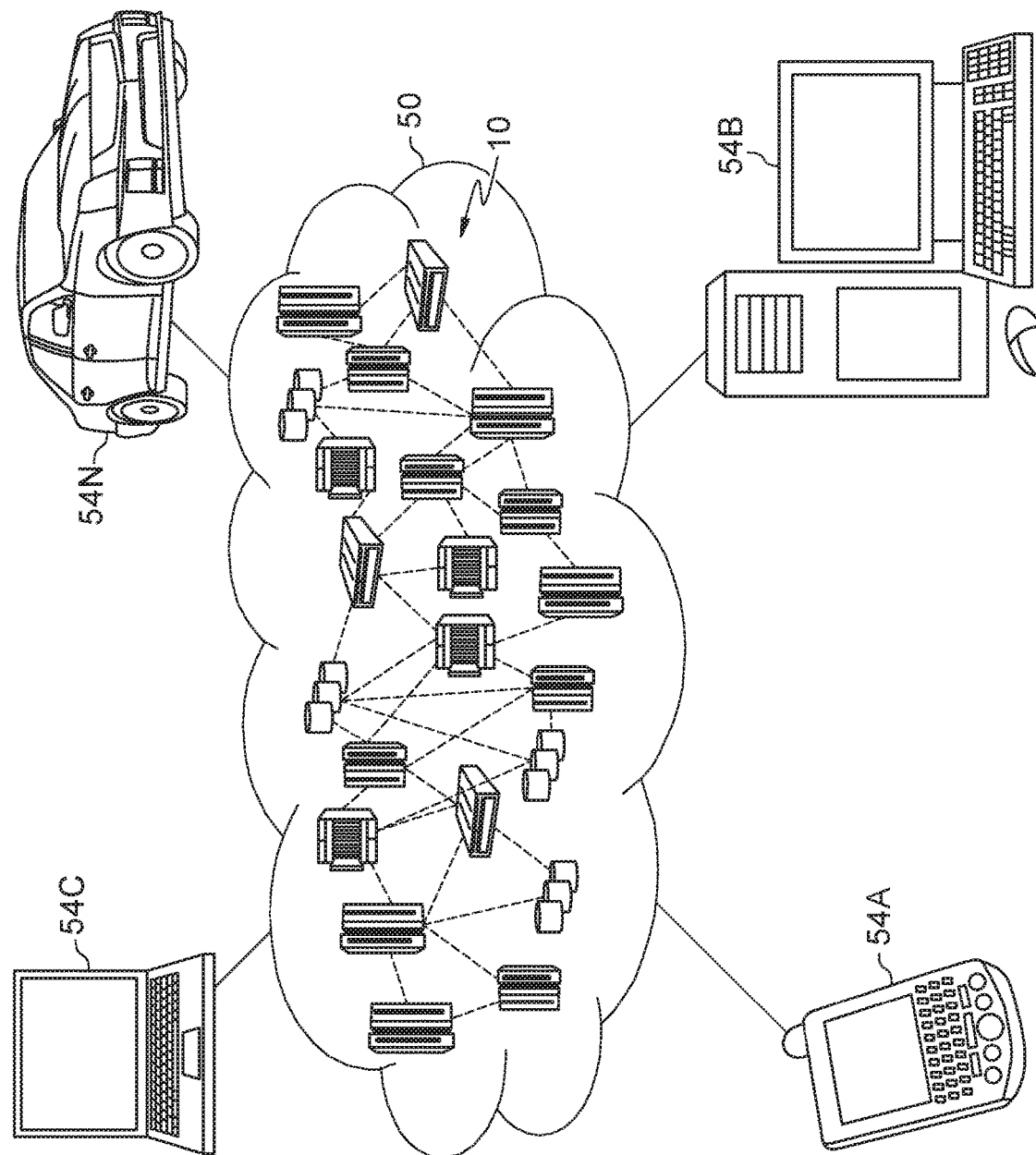
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
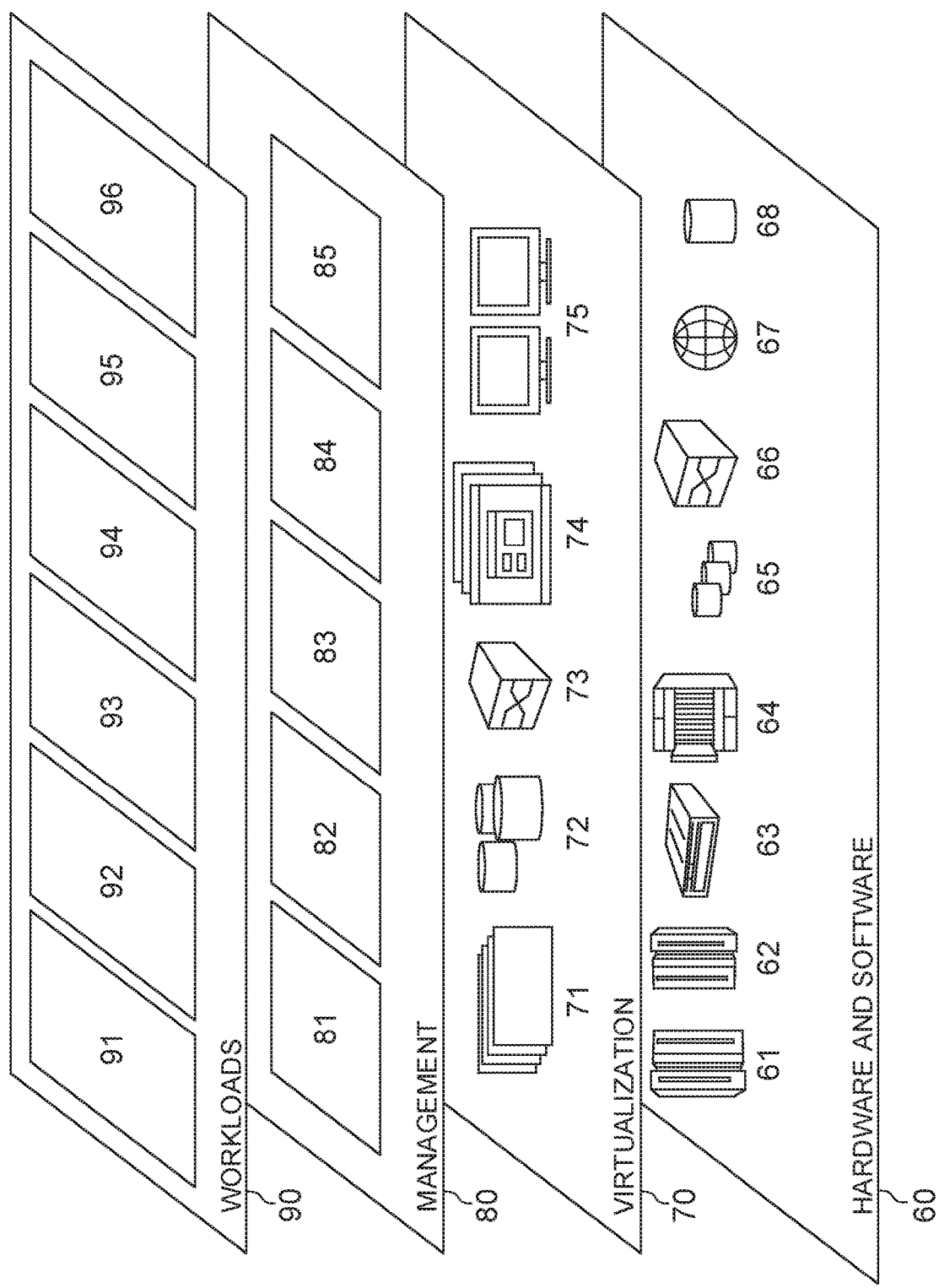
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice access controlling 96. Microservice access controlling 96 may include functionality enabling the cloud computing environment to perform microservice access control to provide context-based, fine-grained access control, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method for context-based, fine-grained data access control to microservice data, the method comprising:

retrieving a sensor data snapshot corresponding to the microservice data from a sensor node array of a microservice platform;

encrypting the sensor data snapshot according to a functional encryption scheme to generate an encrypted sensor data snapshot;

receiving a registration request from a user device, wherein the registration request comprises user event data associated with a user-defined event;

detecting an occurrence of the user-defined event based on sensory event data corresponding to the user event data;

generating a restricted-access functional decryption key in response to detecting the occurrence of the user-defined event, wherein the restricted-access functional decryption key is generated with respect to the encrypted sensor data snapshot based on the sensory event data and a user function associated with the user device; and communicating the restricted-access functional decryption key to the user device for decryption of the encrypted sensor data snapshot by the user device according to an access control policy corresponding to the user-defined event, wherein the access control policy comprises a decryption policy corresponding to the functional encryption scheme.

2. The computer-implemented method of claim 1, wherein generating a restricted-access functional decryption key comprises:
   determining a context of the user device based on the sensory event data associated with the detected occurrence;
   mapping the context of the user device to the access control policy based on the user event data; and
   generating the restricted-access functional decryption key with respect to a composite user function comprising a combination of the user function with a contextual filter corresponding to the access control policy.

3. The computer-implemented method of claim 1, wherein the restricted-access functional decryption key comprises a restricted secret key.

4. The computer-implemented method of claim 1, wherein the occurrence of the user-defined event corresponds to a request by the user device to access the encrypted sensor data snapshot.

5. The computer-implemented method of claim 1, wherein the sensor node array comprises one or more sensor nodes.

6. The computer-implemented method of claim 1, wherein the sensor data snapshot is encrypted according to one of a hierarchical functional encryption scheme, an identity-based encryption scheme, and a multi-input functional encryption scheme.

7. A computer system for context-based, fine-grained data access control to microservice data, the computer system comprising:
   one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
   retrieving a sensor data snapshot corresponding to the microservice data from a sensor node array of a microservice platform;
   encrypting the sensor data snapshot according to a functional encryption scheme to generate an encrypted sensor data snapshot;
   receiving a registration request from a user device, wherein the registration request comprises user event data associated with a user-defined event;
   detecting an occurrence of the user-defined event based on sensory event data corresponding to the user event data;
   generating a restricted-access functional decryption key in response to detecting the occurrence of the user-defined event, wherein the restricted-access functional decryption key is generated with respect to the encrypted sensor data snapshot based on the sensory event data and a user function associated with the user device; and
   communicating the restricted-access functional decryption key to the user device for decryption of the encrypted sensor data snapshot by the user device according to an access control policy corresponding to the user-defined event, wherein the access control policy comprises a decryption policy corresponding to the functional encryption scheme.

8. The computer system of claim 7, wherein generating a restricted-access functional decryption key comprises:
   determining a context of the user device based on the sensory event data associated with the detected occurrence;
   mapping the context of the user device to the access control policy based on the user event data; and
   generating the restricted-access functional decryption key with respect to a composite user function comprising a combination of the user function with a contextual filter corresponding to the access control policy.

9. The computer system of claim 7, wherein the restricted-access functional decryption key comprises a restricted secret key.

10. The computer system of claim 7, wherein the occurrence of the user-defined event corresponds to a request by the user device to access the encrypted sensor data snapshot.

11. The computer system of claim 7, wherein the sensor node array comprises one or more sensor nodes.

12. The computer system of claim 7, wherein the sensor data snapshot is encrypted according to one of a hierarchical functional encryption scheme, an identity-based encryption scheme, and a multi-input functional encryption scheme.

13. A computer program product for context-based, fine-grained data access control to microservice data, the computer program product comprising:
   one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:
   retrieving a sensor data snapshot corresponding to the microservice data from a sensor node array of a microservice platform;
   encrypting the sensor data snapshot according to a functional encryption scheme to generate an encrypted sensor data snapshot;
   receiving a registration request from a user device, wherein the registration request comprises user event data associated with a user-defined event;
   detecting an occurrence of the user-defined event based on sensory event data corresponding to the user event data;
   generating a restricted-access functional decryption key in response to detecting the occurrence of the user-defined event, wherein the restricted-access functional decryption key is generated with respect to the encrypted sensor data snapshot based on the sensory event data and a user function associated with the user device; and
   communicating the restricted-access functional decryption key to the user device for decryption of the encrypted sensor data snapshot by the user device according to an access control policy corresponding to the user-defined event, wherein the access control policy comprises a decryption policy corresponding to the functional encryption scheme.

14. The computer program product of claim 13, wherein generating a restricted-access functional decryption key comprises:

determining a context of the user device based on the sensory event data associated with the detected occurrence;

mapping the context of the user device to the access control policy based on the user event data; and generating the restricted-access functional decryption key with respect to a composite user function comprising a combination of the user function with a contextual filter corresponding to the access control policy.

15. The computer program product of claim 13, wherein the restricted-access functional decryption key comprises a restricted secret key.

16. The computer program product of claim 13, wherein the occurrence of the user-defined event corresponds to a request by the user device to access the encrypted sensor data snapshot.

17. The computer program product of claim 13, wherein the sensor node array comprises one or more sensor nodes.

18. The computer program product of claim 13, wherein the sensor data snapshot is encrypted according to one of a hierarchical functional encryption scheme, an identity-based encryption scheme, and a multi-input functional encryption scheme.

* * * * *